R. DIEDERICHS.
DYEING APPARATUS.
APPLICATION FILED NOV. 24, 1908.
923,342.
Patented June 1, 1909.
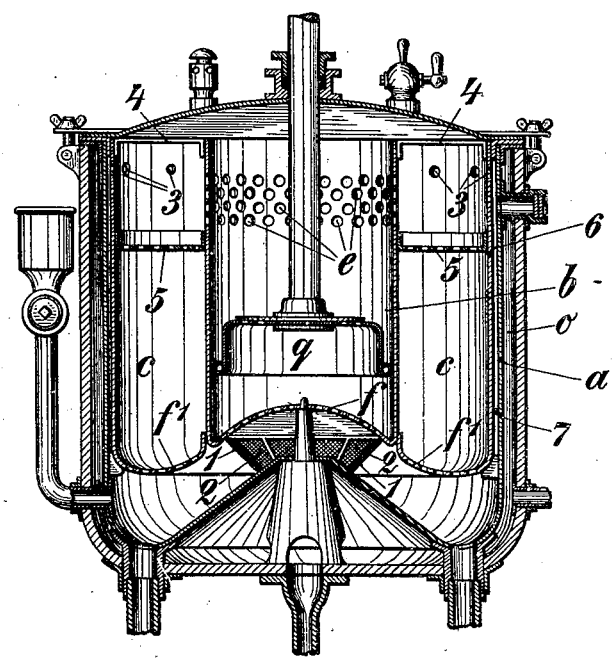

UNITED STATES PATENT OFFICE.

ROBERT DIEDERICHS, OF COLOGNE, GERMANY.

DYEING APPARATUS.

No. 923,342.      Specification of Letters Patent.      Patented June 1, 1909.

Application filed November 24, 1908. Serial No. 464,325.

*To all whom it may concern:*

Be it known that I, ROBERT DIEDERICHS, civil engineer, a subject of the German Emperor, residing at Alteburgerstrasse No. 68, Cologne, in the Province of Rhineland and State of Prussia, Germany, have invented an Improved Dyeing Apparatus, of which the following is a specification.

The present invention relates to a dyeing apparatus for treating textile material and also for mixing liquids with chemicals, dye-stuffs, oils, gases, etc., consisting of two receptacles which are put into one another and leave between themselves interspaces, the internal receptacle being provided at its base and side wall with openings and of a bell-shaped member arranged to move up and down in the internal receptacle.

The characteristic feature of the invention lies in the fact, that a perforated bottom is put down in the interspace or passage formed by the two receptacles put into one another and that this room is given such a width, that the material can be brought into and be treated in it.

The invention will be fully described with reference to the accompanying drawing, in which as an example a suitable machine, which I have designed for the purpose is illustrated in longitudinal section.

The vessel $b$ inserted into the receptacle $a$ is provided with an upwardly bellied perforated bottom $f$ and carries at its upper part openings $e$ and a bell shaped member $q$ is fitted in it, the up and down movement of the latter causing a liquid to be circulated. The size and the cross-section of the receptacle $b$ is now much less than the cross-section of the receptacle $a$ so as to allow the material to be operated upon not only in the receptacle $b$ but also in the passage $c$. The latter is provided for such purpose at the base with a perforated bottom $f'$ onto which the material to be treated is placed. In the form of embodiment, as shown in the drawing, a separate wall 6 is arranged supporting the bottom $f'$, an interspace 7 being left between this wall and that of the receptacle $a$.

Owing to the up and down movement of the bell shaped member the liquid is forced alternately in opposite directions both through the material contained in the receptacle $b$ and through that in the chamber $c$. This arrangement allows, however, at the same time of increasing to any required amount the number of strokes of the bell shaped member and consequently of producing more frequently a change in the direction of circulation of the liquid. In such case the material to be operated upon is exclusively brought into the chamber $c$ in order that the receptacle $b$ remains free from material and that the up and down movement of the bell-shaped member be not checked by it. By reason of this arrangement the bell-shaped member is adapted to be moved up and down readily and at a high speed. Owing to the more frequent change in the circulation of the liquid, the material is correspondingly pressed out and impregnated at shorter intervals; this means that the material is more rapidly and more effectually operated upon.

In the form of embodiment, shown in the drawing, a double sieve 1, 2 is arranged in the chamber formed by the bottom of the receptacles $a$ and $b$, the meshes or openings of which are shifted relative to one another. At any movement in opposite directions, the liquid is flung against and through this double sieve so as to cause every time afresh a thorough intermixture of the liquid itself or of the materials, as chemicals, dyeing stuffs and similar compounds added to this liquid respectively.

The receptacle $a$ may be surrounded, as shown, by a chamber $o$ into which is introduced a refrigerating agent or steam, depending on the nature of the material under treatment in the apparatus or on the class of stuffs to be intermixed or to be added to the liquid respectively. The chamber $o$ may, however, also be omitted, and in place of it the heating or cooling of the liquid may be effected by means of heating- or cooling-devices, arranged in the receptacle $b$.

The receptacle $a$ may carry at the top in its outside jacket openings 3 which serve the purpose of causing the air to pass from the room $c$ into the interspace 7 when the suction bell-shaped member is jumping up, by which means the liquid contained in the chamber $c$ is sucked away in downward direction.

The vessel $b$ and the wall 6 may be connected and stiffened by means of strut-beams 4. As at the base they are connected by the bottom $f'$, the vessel $b$ and the wall 6 can be withdrawn together.

The cycle of operations with my invention is as follows:—When the plunging of the bell-shaped member takes place, the liquid contained in the vessel $b$ is forced in downward direction through the bottom $f$. From the concavity below this bottom it passes, traversing the double sieve 1, 2, through the bottom $f'$ into the ring shaped chamber $c$ and rises upwardly through the material under treatment, therein contained, and from that point it passes again through the holes $e$ into the vessel $b$ sweeping over the bell-shaped suction member, arrived at its deepest position. The material under treatment which might be below the suction bell-shaped member is compressed during this operation and the liquid therein contained is pressed out, such liquid being mixed again when passing the double sieve 1, 2 and forced in upward direction through the material contained in the chamber $c$. Since this material checks the free movement of the current, it is lifted by the latter, owing to this it floats and allows the liquid to pass with less difficulty. When the suction bell-shaped member has reached its deepest position, in which it persists during a short time—as likewise in its highest position—the loosened material under treatment in the chamber $c$ is collapsing again, and during the subsequent jumping up of the bell-shaped suction member it is pressed against the bottom $f'$ by means of the current passing from the top to the bottom, i. e. it is compressed, whereas the material under treatment placed below the bell shaped suction member is drawn out of engagement, consequently loosened and sucks up the liquid by means of the vacuum which comes into being. The very same effect in the treatment of material operated upon is obtained, when the bell-shaped sucking member is rendered stationary and when, in its place, the receptacles $a$ and $b$ with the material therein contained are moved up and down.

In order to avoid the material under treatment contained in the chamber $c$ being conveyed too high by means of the ascending current and being dragged forward by it through the holes $e$ into the chamber $b$, a perforated cover-plate 5 is arranged by means of which the material pushed in upward direction is retained in position.

When, after the treatment is finished, the liquid is evacuated, the cover-plate 5 can be loaded with weights or like articles in order to press out the liquid still contained in the material so that it flows out in downward direction into the dye-bath for being collected there in given cases without noticeable losses and for being used afresh.

I claim:—

1. A device of the character described, comprising an outer vessel, an inner vessel of considerably smaller cross section than the outer vessel to form an annular chamber around the inner vessel, a raised perforated false bottom in said chamber, a perforated bottom for the inner vessel through which communication is established between said inner vessel and that part of the annular chamber which is located beneath the raised perforated false bottom, and a bell-shaped plunger in the inner vessel.

2. In a dyeing apparatus, two receptacles arranged within one another, the internal one of these receptacles considerably smaller in cross section than the external one, there being intermediate the two receptacles a wide annular chamber having its base perforated and supported by a separate wall spaced apart from the jacket of the external receptacle, strut-beams connecting such wall with the interior vessel, both adapted to be withdrawn together, such passage made sufficiently wide for receiving the material to be treated, the internal receptacle provided at its base and side wall with openings and having a perforated upwardly bellied bottom, inside the internal receptacle a bell-shaped member for forcing the liquid to pass alternately in opposite directions, a double sieve in the chamber formed by the bottom of the external and the internal receptacle, said sieve having its meshes shifted relative to one another.

ROBERT DIEDERICHS.

Witnesses:
   FRIEDRICH LENZ,
   LOUIS VANDORN.